US006568196B2

(12) United States Patent
Pittman

(10) Patent No.: US 6,568,196 B2
(45) Date of Patent: May 27, 2003

(54) AIR CONDITIONER

(76) Inventor: Douglas Pittman, 317 Fern Ave., Westmont, NJ (US) 08108

( * ) Notice: Subject to any disclaimer, the term of this patent is extended or adjusted under 35 U.S.C. 154(b) by 0 days.

(21) Appl. No.: 09/911,653

(22) Filed: Jul. 23, 2001

(65) Prior Publication Data

US 2002/0035837 A1 Mar. 28, 2002

Related U.S. Application Data

(60) Provisional application No. 60/220,277, filed on Jul. 24, 2000.

(51) Int. Cl.[7] .............................. F25B 49/00; F25B 43/02
(52) U.S. Cl. ........................................... 62/132; 62/467

(58) Field of Search .................................. 62/467, 132

(56) References Cited

U.S. PATENT DOCUMENTS 3,036,444 A * 5/1962 Cochran .................... 62/467
3,599,443 A * 8/1971 Hutchinson ................ 62/467
5,339,653 A * 8/1994 DeGregoria ............... 62/467

* cited by examiner

Primary Examiner—William C. Doerrler
(74) Attorney, Agent, or Firm—Woodcock Washburn LLP

(57) ABSTRACT

An air conditioning/cooling system employs an elastic medium such as, for example, a rubber band, instead of the working fluid gases typically used in conventional air conditioners. The system is thus benign and environmentally friendly.

34 Claims, 1 Drawing Sheet

AIR CONDITIONER

CROSS-REFERENCE TO RELATED APPLICATIONS

This Application: claims benefit of U.S. provisional Application Ser. No. 60/220,277 filed Jul. 24, 2000.

FIELD OF THE INVENTION

The present invention relates generally to the field of air conditioners.

SUMMARY OF THE INVENTION

The present invention, which is described in detail below, is designed to replace current home, car, commercial and industrial air conditioners with a benign and environmentally friendly system. This new system eliminates all working fluid gases that act as the heat transfer medium.

DETAILED DESCRIPTION OF PREFERRED EMBODIMENTS

Figure 1:
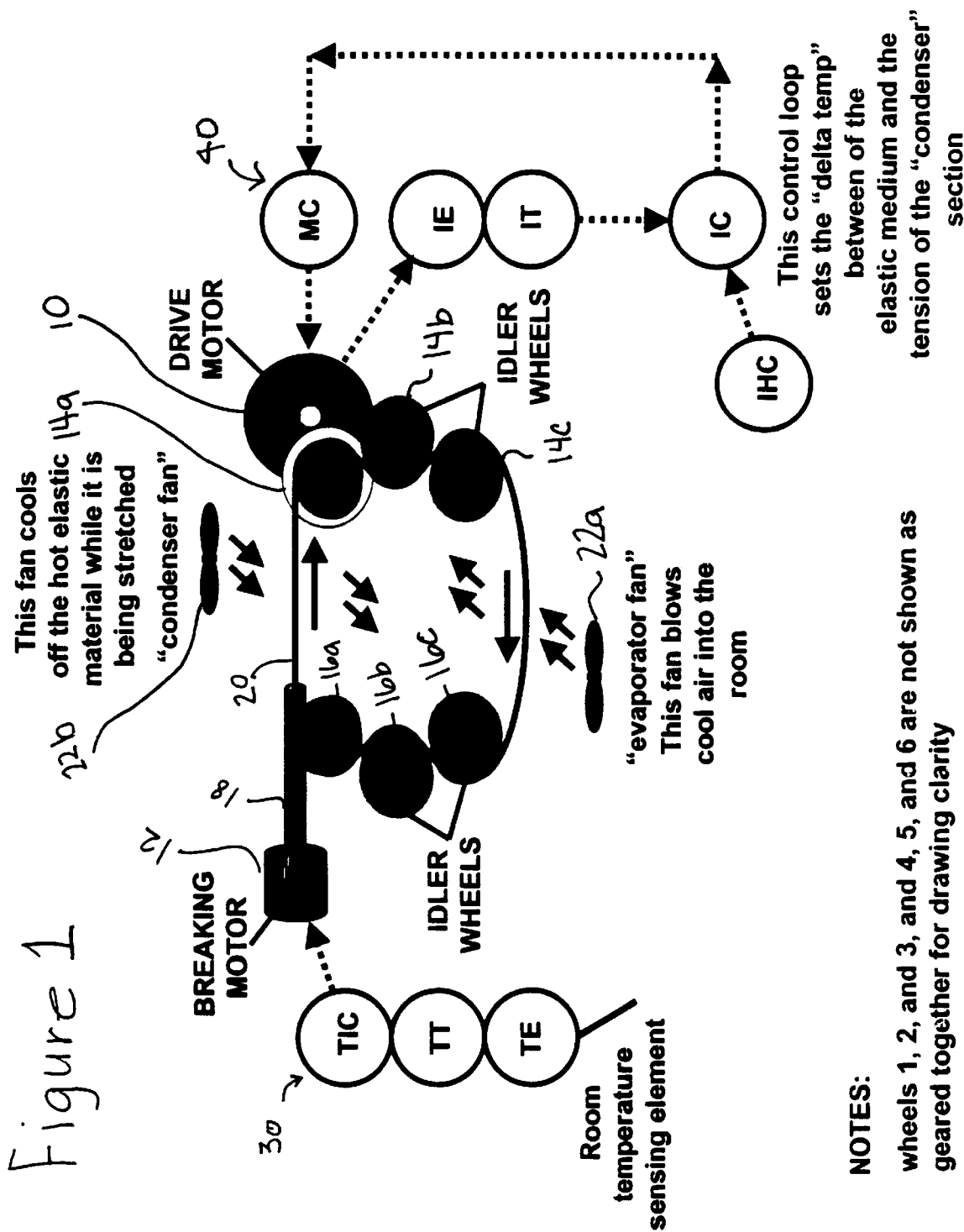
FIG. 1 schematically illustrates one presently preferred embodiment of the invention.

Referring now to FIG. 1, work is performed on an elastic medium by a drive motor 10 running at a faster rate than a breaking motor 12. The drive motor 10 is connected to a roller 14a via a pinion gear (not shown). To prevent the drive motor from overpowering the breaking motor, the breaking motor is connected to its roller 16a via a worm gear 18.

Rollers 14a, 14b and 14c (14b and 14c act as idlers) are geared together as a set and rollers 16a–c are similarly configured (with 16b and 16c acting as idlers). Rollers 14a and 14b, and 16a and 16b act as grippers. Rollers 14b and 16b are adjustable for this purpose.

The area between the breaking and drive motors could be described as the compressor and evaporator sections of a traditional air conditioner. The elastic medium 20 is stretched and heated while at the same time it is cooled to room temperature. In actuality, when an elastic medium is stretched, it is in fact being compressed; i.e., compressed in its cross-sectional dimension but never-the-less compressed, like the working fluid in a traditional air conditioner. The stretched (compressed) portion of the elastic medium 20 is then passed on to what is considered the evaporator section of a typical air conditioner. After the stretched, room temperature elastic medium is allowed to return to normal, uncompressed, cross sectional size, it absorbs heat.

Fan 22a blows air across the slackened rubber band, giving up its heat.

All of the sensors and controls 30, 40 are there to prevent the drive motor from running away and snapping the rubber band and also to maintain automatic temperature control. The controls Reference numbers 30 and 40 in FIG. 1 generally denote the controls and sensors mentioned above. Each of these is further identified as follows:

| | |
|---|---|
| TE | temperature sensing element |
| TT | temperature transmitter |
| TIC | temperature indicating controller (thermostat) |
| MC | drive electronics for the drive motor 10 |
| IE | current sensing element |
| IT | current transmitter |
| IC | drive motor controller, and |
| IHC | a manual setpoint for biasing the IC's output. |

The whole system is cascaded from the room temperature controller TIC, which operates as a normal indicating (or nonindicating if one desires) temperature controller, although its output controls the speed of the breaking motor. "IHC" is a manual "factory" adjustment of the drive motor's controller, "IC". It is an empirically derived setting that accounts for the largest temperature differential between the "condenser" and "evaporator" sections of the system while also taking into account the amount of tension of the "condenser" area. "IE" senses the current load and sends the signal to "IC" to be compared to the setpoint established by "IHC". "IC" then outputs a signal to the drive motors' electronics, "MC" to speed up or slow down the drive motor.

I claim:

1. An air conditioning system employing an elastic medium to serve the function of a working fluid, comprising:
    a continuous loop of an elastic medium; wherein
        the loop rotates around a point inside the loop, and
            wherein the elastic medium alternately accepts and rejects heat at different points in the continuous loop.

2. A system as recited in claim 1, wherein the elastic medium rotates in one direction along a major axis of the loop.

3. A system as recited in claim 2, wherein a first portion of the elastic medium is stretched and a second portion of the elastic medium is not stretched.

4. A system as recited in claim 3, wherein, when stretched, the elastic medium's cross sectional area is reduced, thereby compressing the elastic medium and producing heat.

5. A system as recited in claim 4, wherein the elastic medium is cooled by an external fluid while in the stretched state.

6. A system as recited in claim 5, wherein a second external fluid is passed over the unstretched portion of the elastic medium.

7. A system as recited in claim 6, wherein the first and second external fluids are used in cooling or heating applications as necessary.

8. A system as recited in claim 1, further comprising a system of controls and sensors for controlling the stretching and unstretching portions of the elastic medium.

9. A system as recited in claim 1, further comprising a drive means for rotating the elastic loop.

10. A system as recited in claim 9, further comprising a braking means for controlling the stretching of the elastic medium.

11. A system as recited in claim 10, further comprising automatic controls that sense the cooling of the medium and adjust the stretching of the elastic medium by adjusting the rotational speed of the breaking means.

12. A system as recited in claim 1, further comprising gripping devices that prevent the elastic medium from equalizing the stretched and unstretched portions of the rotating elastic medium.

13. A system as recited in claim 10, wherein said breaking means is driven by a worm gear.

14. A system as recited in claim 3, further comprising idler wheels as a pinching assembly that prevents the elastic medium from equalizing the stretched and unstretched portions of the rotating elastic medium.

15. A system as recited in claim 9, wherein said drive means utilizes a pinion gear assembly.

16. A system as recited in claim 9, wherein a control loop determines the rotational speed of the elastic material.

17. A system as recited in claim 9, wherein:
   a desired amount of heating or cooling is determined by measuring the temperature of that which is to be heated or cooled; and
   the rotational speed of the elastic loop is determined in part by measuring the temperature differential of the stretched and unstretched sections of the elastic loop.

18. An air conditioning system, comprising:
   a continuous loop of an elastic medium; wherein
      the loop rotates around a point inside the loop; and
      Sensors automatically determine any cooling or heating of the elastic medium; and
         Automatic controls adjust the rotational speed of the loop to generate the desired amount of heating or cooling.

19. A system as recited in claim 18, wherein the elastic medium rotates in one direction along a major axis of the loop.

20. A system as recited in claim 19, wherein a first portion of the elastic medium is stretched and a second portion of the elastic medium is not stretched.

21. A system as recited in claim 20, wherein, when stretched, the elastic medium's cross sectional area is reduced, thereby compressing the elastic medium and producing heat.

22. A system as recited in claim 21, wherein the elastic medium is cooled by a first external fluid while in the stretched state.

23. A system as recited in claim 22, wherein a second external fluid is passed over the unstretched portion of the elastic medium.

24. A system as recited in claim 23, wherein the first and second external fluids are used in cooling or heating applications as necessary.

25. A system as recited in claim 18, further comprising a system of controls and sensors for controlling the stretching and unstretching portions of the elastic medium.

26. A system as recited in claim 18, further comprising a drive means for rotating the elastic loop.

27. A system as recited in claim 26, further comprising a braking means for controlling the stretching of the elastic medium.

28. A system as recited in claim 27, further comprising automatic controls that adjust the stretching of the elastic medium by adjusting the rotational speed of the breaking means.

29. A system as recited in claim 18, further comprising gripping devices that prevent the elastic medium from equalizing the stretched and unstretched portions of the rotating elastic medium.

30. A system as recited in claim 27, wherein said breaking means is driven by a worm gear.

31. A system as recited in claim 20, further comprising idler wheels as a pinching assembly that prevents the elastic medium from equalizing the stretched and unstretched portions of the rotating elastic medium.

32. A system as recited in claim 26, wherein said drive means utilizes a pinion gear assembly.

33. A system as recited in claim 18, wherein a control loop determines the rotational speed of the elastic material.

34. A system as recited in claim 18, wherein:
   the desired amount of heating or cooling is determined by measuring the temperature of that which is to be heated or cooled; and
   the rotational speed of the elastic loop is determined in part by measuring the temperature differential of the stretched and unstretched sections of the elastic loop.

* * * * *